US012593219B2

(12) United States Patent
Sellers et al.

(10) Patent No.: US 12,593,219 B2
(45) Date of Patent: Mar. 31, 2026

(54) CARRIER AGGREGATION COMBINATION GENERATOR

(71) Applicant: T-Mobile USA, Inc., Bellevue, WA (US)

(72) Inventors: Benjamin Woodrow Sellers, Seattle, WA (US); William M. Shvodian, McLean, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 412 days.

(21) Appl. No.: 18/148,907

(22) Filed: Dec. 30, 2022

(65) Prior Publication Data

US 2024/0224247 A1      Jul. 4, 2024

(51) Int. Cl.
    *H04W 16/18*          (2009.01)
    *H04W 24/02*          (2009.01)
(52) U.S. Cl.
    CPC ........... *H04W 16/18* (2013.01); *H04W 24/02* (2013.01)
(58) Field of Classification Search
    CPC ..... H04W 16/00; H04W 16/18; H04W 24/00; H04W 24/02
    See application file for complete search history.

(56) References Cited

U.S. PATENT DOCUMENTS

| 9,973,321 B2 | 5/2018 | Henttonen et al. |
| 2013/0142139 A1 | 6/2013 | Kitazoe et al. |

| 2014/0080532 A1* | 3/2014 | Oh ......................... H04W 28/26 |
| | | 455/512 |
| 2016/0262024 A1* | 9/2016 | Freda ................ H04W 72/0453 |
| 2018/0019898 A1* | 1/2018 | Takahashi ........... H04L 25/0204 |

(Continued)

FOREIGN PATENT DOCUMENTS

WO      WO2019193241 A1      10/2019

OTHER PUBLICATIONS

ETSI TS 138 101-1, "5G; NR; User Equipment (UE) radio transmission and reception; Part 1: Range 1 Standalone (3GPP TS 38.101-1 version 17.7.0 Release 17)", available at <<https://standards.iteh.ai/catalog/standards/etsi/5e40cf1d-6651-49b2-a27b-4fcb78a50e2d/etsi-ts-138-101-1-v17-7-0-2022-10>>, Oct. 2022, 727 pages.

(Continued)

*Primary Examiner* — Kevin C. Harper
(74) *Attorney, Agent, or Firm* — Lee & Hayes, P.C.

(57)          ABSTRACT

An entity may submit a carrier aggregation (CA) combination, such as a CA combination that includes at least two carriers that can be used for data transmissions by user equipment and a telecommunication network, to be standardized by a standards organization. A band combination engine can be configured to evaluate the CA combination that is to be submitted for standardization, for example by automatically determining a set of fallback CA combinations that could be used if different carriers of the CA combination were to be lost. The band combination engine can also automatically determine standardization statuses of the fallback CA combinations, to identify whether the fallback CA combinations have already been standardized, have already been submitted for standardization, or should be submitted for standardization along with the CA combination itself.

20 Claims, 7 Drawing Sheets

(56)                    References Cited

U.S. PATENT DOCUMENTS

2023/0397234 A1*  12/2023  Castelo Vega ........ H04W 72/51

OTHER PUBLICATIONS

ETSI TS 138 11-2, "5G; NR; User Equipment (UE) radio transmission and reception; Part 2: Range 2 Standalone (3GPP TS 38.101-2 version 17.7.0 Release 17)", available at <<https://cdn.standards.iteh.ai/samples/67328/a605e095b068470ba83a93699d0fe0f1/ETSI-TS-138-101-2-V17-7-0-2022-10-.pdf>>, Oct. 2022, 220 pages.

* cited by examiner

100

200

300

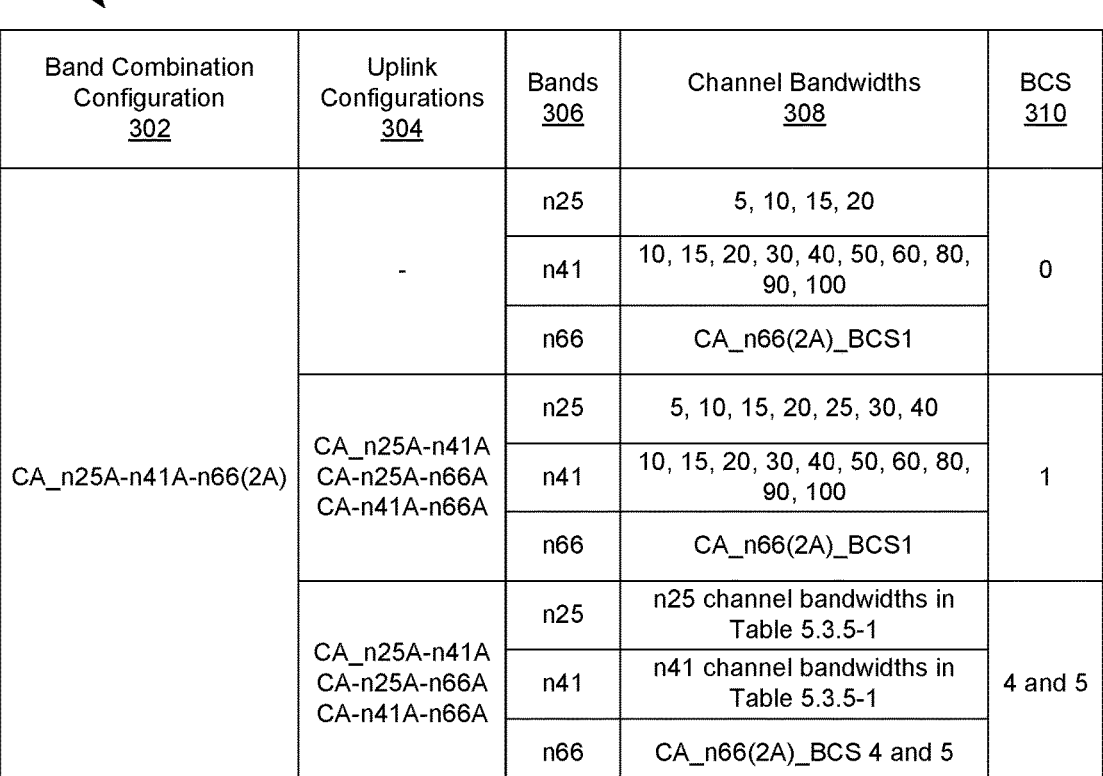

| Band Combination Configuration 302 | Uplink Configurations 304 | Bands 306 | Channel Bandwidths 308 | BCS 310 |
|---|---|---|---|---|
| CA_n25A-n41A-n66(2A) | - | n25 | 5, 10, 15, 20 | 0 |
| | | n41 | 10, 15, 20, 30, 40, 50, 60, 80, 90, 100 | |
| | | n66 | CA_n66(2A)_BCS1 | |
| | CA_n25A-n41A CA-n25A-n66A CA-n41A-n66A | n25 | 5, 10, 15, 20, 25, 30, 40 | 1 |
| | | n41 | 10, 15, 20, 30, 40, 50, 60, 80, 90, 100 | |
| | | n66 | CA_n66(2A)_BCS1 | |
| | CA_n25A-n41A CA-n25A-n66A CA-n41A-n66A | n25 | n25 channel bandwidths in Table 5.3.5-1 | 4 and 5 |
| | | n41 | n41 channel bandwidths in Table 5.3.5-1 | |
| | | n66 | CA_n66(2A)_BCS 4 and 5 | |

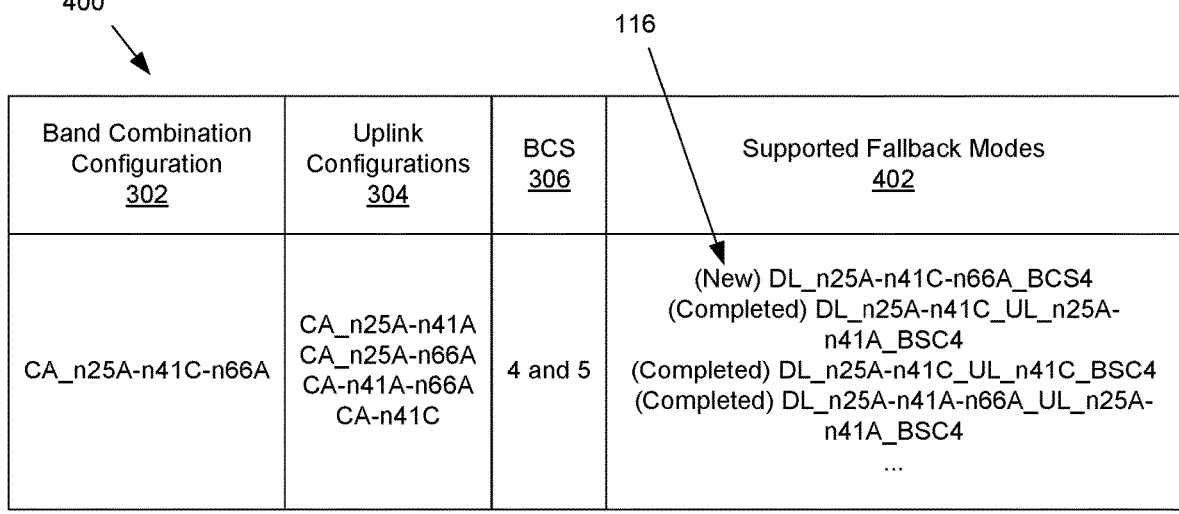

| Band Combination Configuration 302 | Uplink Configurations 304 | BCS 306 | Supported Fallback Modes 402 |
|---|---|---|---|
| CA_n25A-n41C-n66A | CA_n25A-n41A CA_n25A-n66A CA-n41A-n66A CA-n41C | 4 and 5 | (New) DL_n25A-n41C-n66A_BCS4 (Completed) DL_n25A-n41C_UL_n25A-n41A_BSC4 (Completed) DL_n25A-n41C_UL_n41C_BSC4 (Completed) DL_n25A-n41A-n66A_UL_n25A-n41A_BSC4 ... |

FIG. 4

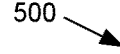

500

| CA BW Class 502 | Downlink Fallback CA BW Class 504 | Uplink Fallback CA BW Class 506 |
|---|---|---|
| FR2: G | FR2: A | FR2: A |
| FR2: H | FR2: G | FR2: G |
| FR2: I | FR2: H | FR2: H |
| FR2: J | FR2: I | FR2: I |
| FR2: K | FR2: J | FR2: J |
| FR2: L | FR2: K | FR2: K |
| FR2: M | FR2: L | FR2: L |
| FR1: (2A) | FR1: A | FR1: A |
| FR1: (3A) | FR1: (2A) | FR1: A |
| FR1: (4A) | FR1: (3A) | FR1: A |
| FR2: (2A) | FR2: A | FR2: A |
| FR2: (3A) | FR2: (2A) | FR2: A |
| FR2: (4A) | FR2: (3A) | FR2: A |
| FR1: CA | FR1: AA | FR1: A |
| FR1: DA | FR1: CA | FR1: A |
| FR1: B | FR1: A | FR1: A |
| FR1: C | FR1: A | FR1: A |
| FR2: (5A) | FR2: (4A) | FR2: A |
| FR2: (6A) | FR2: (5A) | FR2: A |
| FR2: (7A) | FR2: (6A) | FR2: A |
| FR2: (8A) | FR2: (7A) | FR2: A |
| FR2: (G-H) | FR2: (A-H) | FR2: H |
| FR2: (G-H) | FR2: (2G) | FR2: G |
| FR2: (A-H) | FR2: H | FR2: H |
| FR2: (A-H) | FR2: (A-G) | FR2: G |
| FR2: (2G) | FR2: (A-G) | FR2: G |
| FR2: (A-G) | FR2: G | FR2: G |
| FR2: (A-G) | FR2: (2A) | FR2: A |
| FR1: (A-C) | FR1: (2A) | FR1: A |
| FR1: (A-C) | FR1: C | FR1: C |
| FR1: (2A-C) | FR1: (3A) | FR1: A |
| FR1: (2A-C) | FR1: (A-C) | FR1: C |

First Band: n25    CA BW Class: (2A)

Second Band: n41    CA BW Class: A

Third Band:    CA BW Class:

Fourth Band:    CA BW Class:

Fifth Band:    CA BW Class:

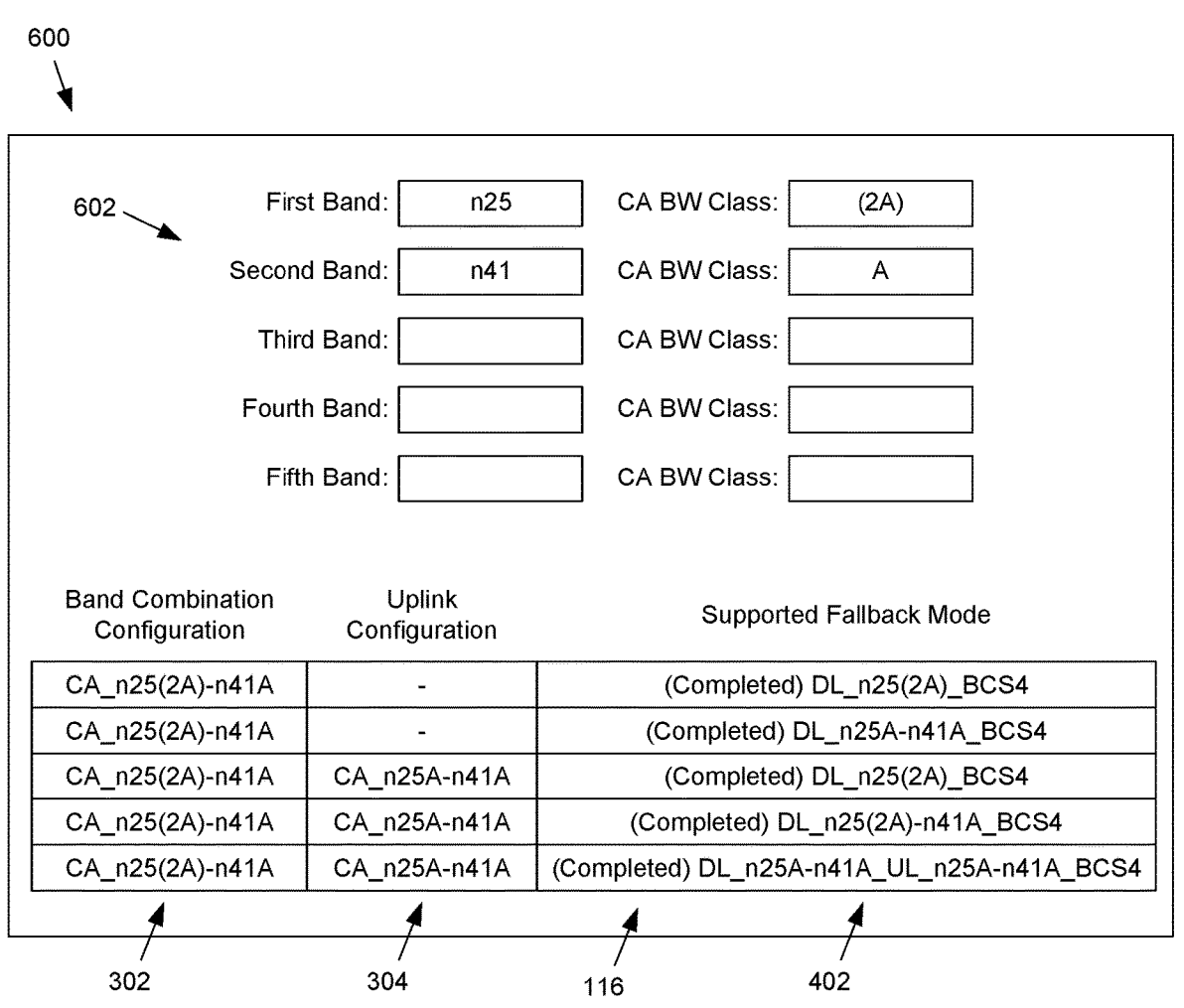

| Band Combination Configuration | Uplink Configuration | Supported Fallback Mode |
|---|---|---|
| CA_n25(2A)-n41A | - | (Completed) DL_n25(2A)_BCS4 |
| CA_n25(2A)-n41A | - | (Completed) DL_n25A-n41A_BCS4 |
| CA_n25(2A)-n41A | CA_n25A-n41A | (Completed) DL_n25(2A)_BCS4 |
| CA_n25(2A)-n41A | CA_n25A-n41A | (Completed) DL_n25(2A)-n41A_BCS4 |
| CA_n25(2A)-n41A | CA_n25A-n41A | (Completed) DL_n25A-n41A_UL_n25A-n41A_BCS4 |

CARRIER AGGREGATION COMBINATION GENERATOR

BACKGROUND

In a telecommunication network, a user equipment (UE) can wirelessly connect to one or more base stations in order to engage in voice calls, video calls, data transfers, or other types of communications. For example, a mobile device, such as a smart phone, can wirelessly connect to one or more gNBs or other base stations of a radio access network (RAN) to access the telecommunication network.

Carrier aggregation (CA) can allow UEs and base stations to exchange data via multiple carriers, such as different carriers associated with different frequencies and/or different frequency bands. For example, a UE can connect to one or more base stations via a first carrier associated with a first frequency band, and via a second carrier associated with a second frequency band, such that the UE can send and/or receive data via both the first carrier and the second carrier. UEs and base stations can use CA via different CA combinations that are associated with different bands, different numbers of carrier per band, and/or other differing attributes.

In some situations, carriers associated with CA combinations may be lost. However, in these situations, UEs and base stations may continue to use CA via fallback CA combinations. For example, a UE and a base station may be using a CA combination that includes a first carrier, a second carrier, and a third carrier in one or more frequency bands. If the first carrier is lost in this example, the UE and the base station can fall back to using CA via a fallback CA combination that includes the second carrier and the third carrier.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 shows an example CA combination.

FIG. 4 shows an example standardization request that includes information about a new CA combination that being submitted to a standards organization for standardization.

FIG. 5 shows example fallback CA options that can be stored in a band combination database and/or that can be used by a fallback combination determiner of the CA combination generation system.

FIG. 6 shows an example of a user interface of a band combination engine.

DETAILED DESCRIPTION

Figure 1:
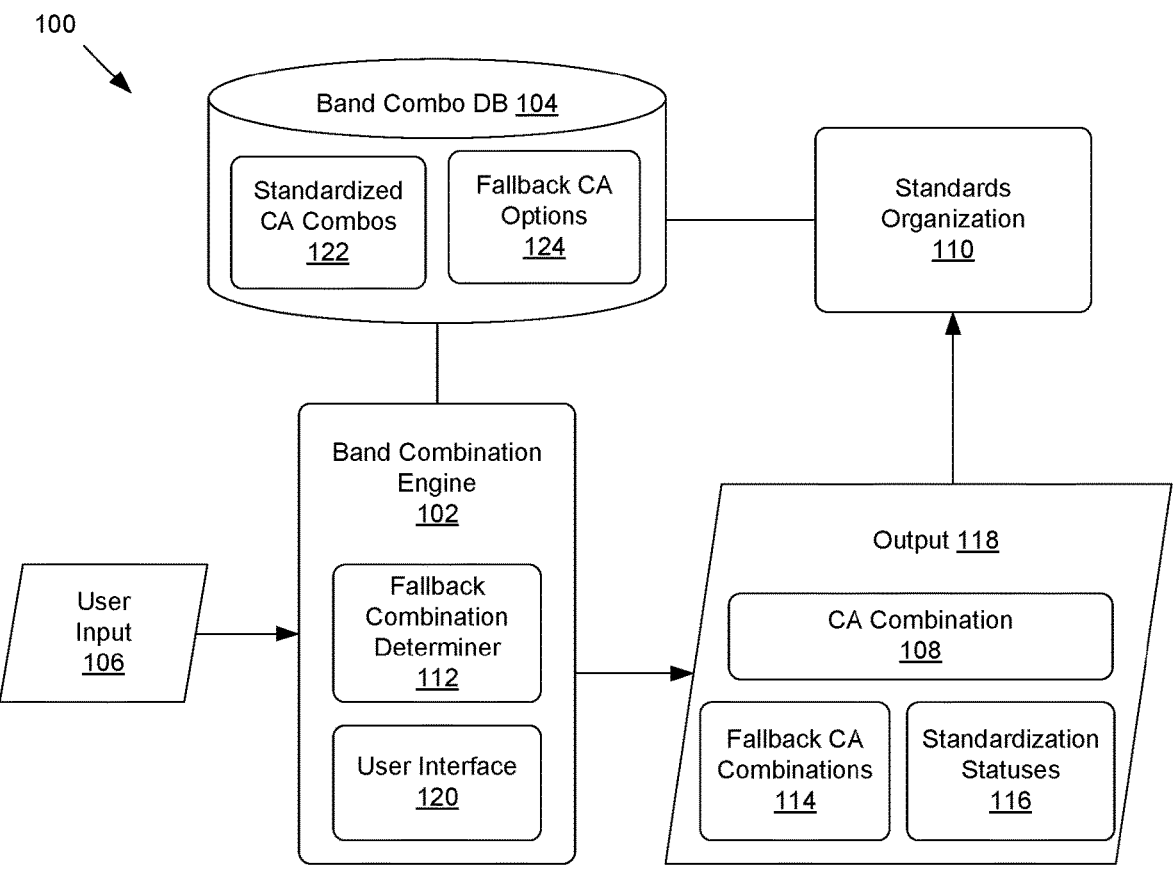
FIG. 1 shows an example of a carrier aggregation (CA) combination generation system.

A UE can wirelessly connect to at least one base station of a telecommunication network, such as a gNB of a fifth generation (5G) New Radio (NR) radio access network. When connected to a base station, the UE can send uplink data to the base station and receive downlink data from the base station.

UEs and base stations can support carrier aggregation (CA), such as uplink carrier aggregation and/or downlink carrier aggregation. During CA transmissions, a UE and one or more base stations can use multiple component carriers to exchange data. The component carriers can be centered at frequencies within one or more frequency bands. For instance, the component carriers can span a contiguous range of frequencies in a single frequency band, be at non-contiguous frequency ranges in a single frequency band, or be at frequency ranges in multiple frequency bands.

Various CA combinations can be used by the base stations and the UEs. CA combinations can define combinations of one or more frequency bands to be used for uplink and/or downlink CA transmissions, numbers of carriers to be used within the defined frequency bands, aggregated bandwidth that can be achieved via the carriers, and/or channel bandwidths that can be used for the carriers within the defined frequency bands.

CA combinations can also be associated with corresponding fallback CA combinations. A fallback CA combination associated with a particular CA combination can be a lower-order combination of the components of the particular CA combination, which can be used if a carrier defined by the particular CA combination is lost. For example, a base station and a UE may use a CA combination with a first carrier in a first frequency band, a second carrier in a second frequency band, and a third carrier in a third frequency band. However, if the first carrier is lost, the base station and the UE can fall back to using CA via a fallback CA combination that includes the second carrier in the second frequency band and the third carrier in the third frequency band.

CA combinations can be approved and standardized by a standards organization, such as the Third Generation Partnership Project (3GPP). For example, a CA combination can be submitted to 3GPP for standardization. When a CA combination is submitted to a standards organization, the standards organization can determine whether to approve and standardize the CA combination, for instance based on an evaluation of how carriers, bands, and/or other attributes of the CA combination interact. For example, two or more carriers of the CA combination can be evaluated to determine whether intermodulation products created by simultaneous usage of the carriers may lead to self-interference or interference outside one or more bands, to determine whether transmit power of the CA combination should be limited based on such interactions, and/or to determine other attributes of the CA combination that may impact standardization of the CA combination. If a CA combination submitted to a standards organization is approved and standardized, the CA combination can be used by UEs, base stations, and/or other elements of the telecommunication network.

However, generating new CA combinations to be submitted for standardization can be difficult, time-intensive, and error-prone. For example, as the number of frequency bands that can be used for CA has grown, the number of carriers that can be used simultaneously during CA transmissions has grown, the ranges of allowable aggregated bandwidths that can be achieved via CA has changed, and the sets of channel bandwidths that can be used for carriers in frequency bands have changed, the complexity of possible CA combinations that may include different frequency bands, different numbers of carriers in the frequency bands, different aggregated bandwidth amounts, and/or different channel bandwidths for the carriers in the frequency bands has increased.

Moreover, when a request is submitted to a standards organization to standardize a particular CA combination, the standards organization may require that the request identify each possible lower-order fallback CA combination that corresponds to the particular CA combination being submitted for standardization, as well as the standardization status of each of the possible fallback CA combinations. For example, 3GPP may require that a party submitting a new CA combination for standardization identify all of the possible fallback CA combinations associated with the new CA combination, including fallback CA combinations that include both downlink and uplink CA combinations. 3GPP may also require that the party submitting the new CA combination indicate the standardization status of each of the identified fallback CA combinations, to help ensure that all of the fallback CA combinations associated with the submitted CA combination have been standardized or submitted for standardization and evaluated before the submitted CA combination can be approved and/or standardized. For example, before a submitted CA combination can be standardized, the standards organization may want to ensure that all the corresponding fallback CA combinations have been standardized or evaluated for standardization as discussed above by determining potential interference and/or other attributes associated with the fallback CA combinations.

Determining the set of possible fallback CA combinations associated with a particular CA combination, and determining the standardization status of each of the possible fallback CA combinations, can be difficult, time-intensive, and error-prone. Because each fallback CA combination may be associated with the loss of a single downlink or uplink carrier from a CA combination, the CA combination may be associated with carriers in multiple bands that could be lost, and different fallback options may exist for different carrier arrangements and/or bands, there may be a relatively large number of permutations of carriers of those bands that could still be used as fallback combinations for uplink and/or downlink transmissions if different carriers of the CA combination are lost. It can accordingly be difficult, time-intensive, and error-prone to identify all the fallback CA combinations corresponding to the CA combination, as well as to determine whether each of the fallback CA combinations have already been standardized or have been submitted for standardization.

These issues may be compounded for parties that submit a large number of CA combinations for standardization at the same time. For example, 3GPP accepts requests for standardization of new CA combinations quarterly, and an individual standardization request submitted during a quarter from a party may include tens or hundreds of new CA combinations. As discussed above, any or all of those individual new CA combinations can be associated with relatively large numbers of corresponding fallback CA combinations. Accordingly, it can be difficult, time-intensive, and error-prone to ensure that, for a standardization request being submitted to a standards organization for a large set of new CA combinations, all of the associated fallback CA combinations and corresponding standardization statuses have been identified and included in the standardization request along with each new CA combination being submitted for standardization.

For example, if an entity intends to submit a set of fifty new CA combinations, it can be difficult for a user to evaluate each of the fifty CA combinations, identify all of the possible fallback CA combinations that can be associated with each of the fifty CA combinations, and determine the standardization statuses associated with each of the possible fallback CA combinations. It may take weeks or months for users to manually evaluate all of the fifty CA combinations. Moreover, users can make mistakes, and erroneously list duplicate fallback CA combinations, incomplete lists of possible fallback CA combinations, and/or inaccurate standardization statuses associated with fallback CA combinations. Additionally, even if users identify some new fallback CA combinations that have not yet been standardized, the users may forget to submit the new fallback CA combinations for standardization along with the higher-order CA combination. Such errors can lead to wasted computing resources as the errors are investigated and corrected.

Moreover, due to the time and effort needed to conventionally evaluate a set of CA combinations being submitted for standardization, including identifying all the corresponding fallback CA combinations and the standardization statuses of the fallback CA combinations, network improvements can be hindered. For example, UEs and/or a telecommunication network may not support CA combinations until the CA combinations are standardized. Accordingly, UEs and the telecommunication network may be limited to using already-standardized CA combinations, even if CA combinations that are not yet standardized could have been used in some situations to achieve higher throughput, bandwidth, connectivity uptime, and/or other benefits than the already-standardized CA combinations.

The systems and methods described herein can automatically generate a set of fallback CA combinations associated with a CA combination, for instance by determining allowable fallback options associated with the loss of a carrier in one or more bands of the CA combination. The systems and methods can also automatically determine a standardization status of each of the fallback CA combinations. The set of fallback CA combinations associated with the CA combination, and the corresponding standardization statuses of the fallback CA combinations, determined automatically via the systems and methods described herein, can be displayed via a user interface and/or can be submitted to a standards organization in a request to standardize the CA combination. The systems and methods described herein can thus determine fallback CA combinations and corresponding standardization statuses for standardization requests more quickly and/or with fewer errors than conventional systems. Accordingly, new CA combinations can be submitted for standardization and/or be standardized more quickly and/or in larger groups, which can lead to a faster increase in standardized CA options for UEs and telecommunication networks that can improve network performance and efficiency.

Example Environment

FIG. 1 shows an example of a carrier aggregation (CA) combination generation system 100. The CA combination generation system 100 can include a band combination engine 102 and a band combination database 104. The band combination engine 102 can accept user input 106 that defines a CA combination 108 that is under consideration for standardization with a standards organization 110, such as 3GPP. The band combination engine 102 can have a fallback combination determiner 112 that generates a set of fallback CA combinations 114 associated with the CA combination 108. The fallback combination determiner 112 can also determine, based on information stored in the band combination database 104, standardization statuses 116 associated with the fallback CA combinations 114. Output 118 of the band combination engine 102, such as the CA combination 108 and the corresponding fallback CA combinations 114 and standardization statuses 116, can be displayed via a user interface 120 of the band combination engine 102 and/or can be provided to the standards organization 110, as described further below.

Figure 2:
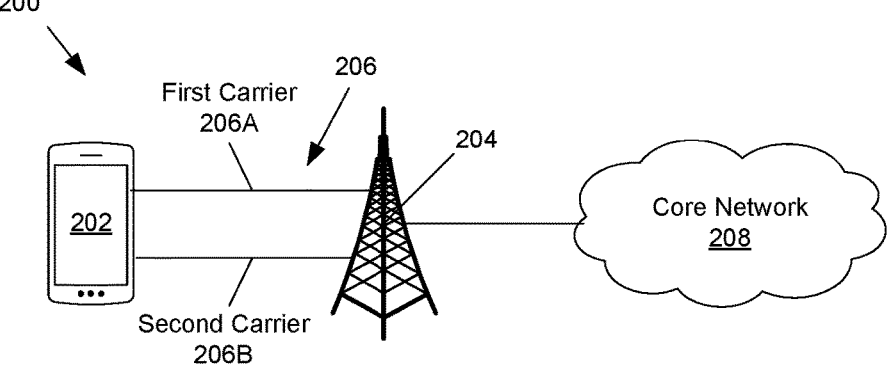
FIG. 2 shows an example of a network environment in which a user equipment (UE) can connect to at least one base station of a telecommunication network via multiple carriers based on a CA combination and/or fallback CA combinations.

The CA combination 108 and the corresponding fallback CA combinations 114 can be used for uplink and/or downlink carrier aggregation during communications between a user equipment (UE) and one or more base stations of a telecommunication network. For example, FIG. 2 shows an example 200 of a network environment in which a UE 202 can connect to at least one base station 204 of a telecommunication network via multiple carriers 206 based on the CA combination 108 and/or fallback CA combinations 114.

The UE 202 can be a device that wirelessly connects to one or more base stations 204. In some examples, the UE 202 can be a mobile phone, such as a smart phone or other cellular phone. In other examples, the UE 202 can be a personal digital assistant (PDA), a media player, a tablet computer, a gaming device, a smart watch, a hotspot, an Internet of Things (IOT) device, a personal computer (PC) such as a laptop, desktop, or workstation, or any other type of computing or communication device.

The base stations 204 can be part of an access network of the telecommunication network, such as a radio access network (RAN). In addition to the access network, the telecommunication network can also have a core network 208 linked to the access network. The UE 202 can wirelessly connect to one or more base stations 204 of the access network, and in turn be connected to the core network 208 via the base stations 204. The core network 208 can also link the UE 202 to an Internet Protocol (IP) Multimedia Subsystem (IMS), the Internet, and/or other networks.

The UE 202 and elements of the telecommunication network, such as base stations 204, other elements of the access network, and/or the core network 208, can be compatible with one or more radio access technologies, wireless access technologies, protocols, and/or standards. For example, the UE 202, the base stations 204, and/or the core network 208 can support 5G NR technology, Long-Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, WiFi® technology, and/or any other previous or future generation of radio access technology.

As an example, a base station 204 can be a gNB of a 5G access network. As another example, the access network can be an LTE access network, known as an Evolved UMTS Terrestrial Radio Access Network (E-UTRAN), and a base station 204 can be an evolved Node B (eNB) of the LTE access network. The core network 208 can also be based on LTE or 5G. For instance, the core network 208 can be a 5G core network or an LTE packet core network known as an Evolved Packet Core (EPC). A base station 204 and the core network 208 may be based on the same radio access technology, or different radio access technologies. For instance, in some examples a base station 204 can be a 5G gNB that is linked to an LTE core network and/or a 5G core network.

The UE 202 can transmit data to, and/or receive data from, one or more base stations 204. For example, the UE 202 can receive downlink transmissions from a base station 204, for instance to download data, receive voice and/or video data during calls, and/or receive any other type of data. As another example, the UE 202 can send uplink transmissions to a base station 204 to upload data, submit requests for services, transmit voice and/or video data during calls, and/or to transmit any other type of data from the UE 202 to the base station 204, the core network 208, an IMS, the Internet, and/or other networks.

The UE 202 and the base stations 204 can support one or more frequency bands. Accordingly, the UE 202 can wirelessly connect to a base station 204 using one or more frequency bands supported by both the UE 202 and the base station 204. Such frequency bands can include low bands, mid-band, and/or high bands. For instance, low bands can be associated with frequencies under 1 GHz, mid-bands can be associated with frequencies between 1 GHz and 6 GHz, and high bands can be associated with frequencies above 6 GHz, such as millimeter wave (mmW) frequencies above 24 GHz. Low bands and mid-bands associated with frequencies below 6 GHz can be known as bands in Frequency Range 1 (FR1), while high bands associated with frequencies above 6 GHz can be known as bands in Frequency Range 2 (FR2). As an example, 5G NR spectrum can include low bands, mid-bands, and mmW bands including, but not limited to:

| Band | Shorthand Frequency (MHz) | Uplink Band (MHz) | Downlink Band (MHz) |
|---|---|---|---|
| n2 (Mid-Band) | 1900 | 1850-1910 | 1930-1990 |
| n12 (Low Band) | 700 | 699-716 | 729-746 |
| n25 (Mid-Band) | 1900 | 1850-1915 | 1930-1995 |
| n41 (Mid-Band) | 2500 | 2496-2690 | 2496-2690 |
| n66 (Mid-Band) | 1700 | 1710-1780 | 2110-2200 |
| n71 (Low Band) | 600 | 663-698 | 617-652 |
| n77 (Mid-Band) | 3700 | 3300-4200 | 3300-4200 |
| n260 (mmW) | 39000 (39 GHz) | 37000-40000 | 37000-40000 |
| n261 (mmW) | 28000 (28 GHz) | 27500-28350 | 27500-28350 |

Frequencies in different bands may have different properties. For example, lower-frequency signals can often propagate over larger distances than higher-frequency signals, and may be able to better penetrate through objects than higher-frequency signals. However, higher-frequency signals can often be used to transmit data more quickly than lower-frequency signals.

The UE 202 and one or more base stations 204 can use carrier aggregation (CA) to transmit data during uplink and/or downlink transmissions via multiple carriers 206, such as a first carrier 206A and a second carrier 206B as shown in FIG. 2. By transmitting data via multiple carriers 206, CA can increase bandwidth, increase throughput, and/or result in other benefits relative to transmitting data via a single carrier 206.

Carriers 206 used for CA can be centered at frequencies within one or more frequency bands. For intra-band contiguous CA, the carriers 206 can span a contiguous range of frequencies in a single frequency band. For intra-band non-contiguous CA, the carriers 206 can be at non-contiguous frequency ranges in a single frequency band. For inter-band CA, the carriers 206 can be at frequency ranges in different frequency bands.

Returning to FIG. 1, the CA combination 108 and the fallback CA combinations 114 can define specific frequency bands associated with carriers 206. The CA combination 108 and the fallback CA combinations 114 can also define a number of carriers 206 to be used within each of the defined frequency bands, indicate whether the carriers 206 can be contagious or non-contiguous, indicate ranges of total aggregated bandwidth that can be achieved via the carriers 206, and/or indicate allowable channel bandwidths that can be used for carriers 206 within each of the defined frequency bands. Different CA combinations 108 and different fallback CA combinations 114 can accordingly be associated with different combinations of frequency bands, different numbers of carriers 206 in each frequency band, different aggregated bandwidth values, and/or different sets of allowable channels bandwidths for the carriers 206.

As an example, FIG. 3 shows an example CA combination 300. The CA combination 300 is associated with a band combination configuration 302 for downlink CA, corresponding uplink configurations 304, corresponding bands 306 used in the CA combination 300, channel bandwidths 308 that are usable for carriers 206 in the bands 306, and numbers indicating at least one bandwidth combination set (BCS) 310 associated with the channel bandwidths 308.

The band combination configuration 302 and the uplink configurations 304 can indicate the bands 306 that are to be used for downlink carriers 206 and uplink carriers 206, as well as CA bandwidth classes associated with each of the bands 306. CA bandwidth classes can be indicated by alphanumeric codes or other values that follow identifiers of the bands 306 in the band combination configuration 302 and the uplink configurations 304. Each CA bandwidth class can indicate a number of contiguous carriers 206, and a range of a total aggregated bandwidth that can be achieved using the number of contiguous carriers 206.

The CA bandwidth classes can be defined in 3GPP TS 38.101-1 for FRI bands, and in 3GPP TS 38.101-2 for FR2 bands. For example, a CA bandwidth class of "A" for a FRI band can indicate that a single contiguous carrier can be present in a band, a CA bandwidth class of "B" can indicate that two contagious carriers can be present in a band that have an aggregated channel bandwidth between 20 MHz and 100 MHz, and a CA bandwidth class of "C" can indicate that two contagious carriers can be present in a band that have an aggregated channel bandwidth between 100 MHz and twice the maximum channel bandwidth per carrier. A number of non-contagious carriers can also be indicated by CA bandwidth classes. For example, a CA bandwidth class of "(2A)" can indicate that two non-contiguous carriers can be present in a band.

As an example, the band combination configuration 302 for downlink CA shown in FIG. 3 is "CA_n25A-n41A-n66 (2A)." The band combination configuration 302 indicates that the CA combination 300 is associated with three bands 306: n25, n41, and n66. The "A" designations following the identifiers of bands n25 and n41 in the band combination configuration 302 are CA bandwidth classes indicating that one carrier is in band n25 and one carrier is in band n41. The "(2A)" designation following the identifier of band n66 in the band combination configuration 302 is a CA bandwidth class indicating that two non-contiguous carriers are in band n66.

As discussed above, the band combination configuration 302 can indicate combinations of downlink carriers 206 in bands 306 for downlink CA. The uplink configurations 304 can indicate combinations of uplink carriers 206 for uplink CA that can be used in one or more bands 306 associated with the band combination configuration 302. In some examples, uplink CA transmissions can occur via intra-band CA using carriers in any one of the bands 306 indicated by the band combination configuration 302. In other examples, uplink CA transmissions can occur via inter-band CA using carriers in any two of the bands 306 indicated by the band combination configuration 302.

The CA combination 300 can also identify, for the band combination configuration 302 and/or corresponding uplink configurations 304, which channel bandwidths 308 can be used for carriers 206 within the identified bands 306, and/or a BCS 310 that is associated with or that defines corresponding channel bandwidths 308. For example, a BCS 310 of "0" for band n25 can indicate that carriers 206 with channel bandwidths of 5, 10, 15, and 20 MHz are allowable on band n25, a BCS 310 of "1" for band n25 can indicate that carriers 206 with channel bandwidths of 5, 10, 15, 20, 25, 30, and 40 MHz are allowable on band n25, and a BCS 310 of "4 and 5" can indicate that the channel bandwidths of carriers 206 allowable on band n25 are defined in Table 5.3.5-1 of 3GPP TS 38.101-1.

As an example, the uplink configurations 304 can indicate that two carriers can be used for uplink CA in any one of the n25, n41, or n66 bands in association with the channel bandwidths of BCS "0." As another example, the uplink configurations 304 associated with BCS "1" and BCS "4 and 5" indicate that one uplink carrier is in band n25 and one uplink carrier is in band n41 for uplink configuration "CA_n25A-n41A," one uplink carrier is in band n25 and one uplink carrier is in band n66 for uplink configuration "CA_n25A-n66A," and one uplink carrier is in band n41 and one uplink carrier is in band n66 for uplink configuration "CA_n41A-n66A."

The example CA combination 300 shown in FIG. 3 can be a CA combination that has been standardized by the standards organization 110, or that has been or is being submitted to the standards organization 110 for standardization. As discussed above, a standardization request associated with the example CA combination 300 can be submitted to the standards organization 110, such that the standards organization 110 can approve and/or standardize the example CA combination 300. An example of a standardization request is described further below with respect to FIG. 4.

FIG. 4 shows an example standardization request 400 that includes information about a new CA combination that being submitted to the standards organization 110 for standardization. Similar to FIG. 3, the standardization request 400 can include a band combination configuration 302, corresponding uplink configurations 304, and a BCS 310. The standardization request 400 can additionally indicate supported fallback modes 402 that correspond to the band combination configuration 302 and/or the uplink configurations 304.

The supported fallback modes 402 can be fallback CA combinations 114 associated with the new CA combination being submitted for standardization, such as lower-order CA combinations that UEs 202 and base stations 204 can fall back to using if carriers 206 allowed by the new CA combination are lost. The fallback CA combinations 114, identified as supported fallback modes 402 in the standardization request 400, can be lower-order combinations of the downlink carriers 206 and/or uplink carriers 206 permitted by the band combination configuration 302 and the uplink configurations 304 associated with the new CA combination being submitted for standardization.

For example, if the new CA combination is standardized, a UE 202 and one or more base stations 204 may use four downlink carriers (one carrier in band n25, two contiguous carriers in band n41, and one carrier in band n66) for downlink CA according to the band combination configuration 302 of "CA_n25A-n41C-n66A." If the new CA combination is standardized, the UE 202 and the one or more base stations 204 may also use two uplink carriers for uplink CA, such as one carrier in the n25 band and one carrier in the n41 band according to the uplink configuration 304 of "CA_n25A-n41A," one carrier in the n25 band and one carrier in the n66 band according to the uplink configuration 304 of "CA_n25A-n66A," one carrier in the n41 band and one carrier in the n66 band according to the uplink configuration 304 of "CA_n41A-n66A," or two contiguous carriers in the n41 band according to the uplink configuration 304 of "CA-n41C."

However, if in this example any of the downlink or uplink carriers defined by the band combination configuration 302 or any of the corresponding uplink configurations 304 is lost, the UE 202 and the one or more base stations 204 can fall back to using one of the fallback CA combinations 114 identified by the corresponding supported fallback modes 402. For instance, if one of the two uplink carriers is lost, the UE 202 and the base stations 204 can fall back to using the four downlink carriers (one carrier in band n25, two contiguous carriers in band n41, and one carrier in band n66) for downlink CA, and use the single remaining uplink carrier 206 (without using uplink CA) in any of the supported bands as defined by the supported fallback mode 402 of "DL_n25A-n41C-n66A_BCS4." If instead the downlink carrier associated with band n66 is lost, the UE 202 and the base stations 204 can fall back to using the three remaining downlink carriers 206 (one carrier in band n25 and two contiguous carriers in band n41) for downlink CA and two uplink carriers 206 in any of the supported bands for uplink CA, as defined by supported fallback modes 402 such as "DL_n25A-n41C_UL_n25A-n41A_BSC4" and "DL_n25A-n41C_UL_n41C_BSC4."

As shown in FIG. 4, the supported fallback modes 402 in the standardization request 400 can indicate the standardization statuses 116 of the fallback CA combinations 114 associated with the supported fallback modes 402. The standardization status 116 of a fallback CA combination can be "New" to indicate that the fallback CA combination is a separate new CA combination that is also being submitted to the standards organization 110 at the same time as the new CA combination associated with the band combination configuration 302 and the uplink configurations 304 identified in the standardization request 400. The standardization statuses 116 can also be other values, such as "Completed" to indicate that corresponding fallback CA combinations 114 have already been standardized, or "In Progress" to indicate that the corresponding fallback CA combinations 114 have previously been submitted for standardization but have not yet been approved.

Returning to FIG. 1, when user input 106 defining a CA combination 108 is provided to the band combination engine 102, the fallback combination determiner 112 can automatically determine a set of corresponding fallback CA combinations 114 associated with the CA combination 108. The fallback combination determiner 112 can also automatically determine the standardization statuses 116 of the fallback CA combinations 114. Output 118 of the band combination engine 102, including the CA combination 108, the corresponding fallback CA combinations 114, and the standardization statuses 116 of the fallback CA combinations 114, can be provided as a standardization request to the standards organization 110, or can be used to generate a standardization request that can be submitted to the standards organization 110. As an example, the output 118 can be a spreadsheet or other data file, which a user or other application can use to generate standardization request that can be submitted to the standards organization 110. As another example, the output 118 can be a standardization request, or the band combination engine 102 can automatically generate a standardization request based on the output 118.

For example, when the fallback combination determiner 112 determines a set of fallback CA combinations 114 associated with a CA combination 108, and determines corresponding standardization statuses 116 of the fallback CA combinations 114, a standardization request similar to the example standardization request 400 shown in FIG. 4 can be generated and/or submitted to the standards organization 110. The standardization request can identify the band combination configuration 302, the uplink configurations 304, and the BCS 310 associated with the CA combination 108, for example as shown in FIG. 4. The standardization request can also identify, as supported fallback modes 402 associated with the CA combination 108, the fallback CA combinations 114 and corresponding standardization statuses 116 associated with the CA combination 108 that have been determined by the fallback combination determiner 112.

The fallback combination determiner 112 and/or other elements of the band combination engine 102 can be configured to interact with the band combination database 104 to determine the set of fallback CA combinations 114, and corresponding standardization statuses 116, associated with the CA combination 108. The band combination database 104 can store information about standardized CA combinations 122, and information indicating fallback CA options 124 associated with bands 306.

The band combination database 104 can store information about standardized CA combinations 122 that have been standardized by the standards organization 110, or that have been submitted to the standards organization 110 for potential standardization. The band combination database 104 can also store information indicating fallback CA options 124 associated with bands 306.

The standardized CA combinations 122, tracked in the band combination database 104, can be CA combinations that have been standardized by the standards organization 110, or that have been submitted to the standards organization 110 for potential standardization. For example, when a CA combination is submitted to the standards organization 110, the band combination database 104 can be updated to indicate that the CA combination has been submitted for standardization. Similarly, when the standards organization 110 approves a CA combination for standardization, the band combination database 104 can be updated to indicate that the CA combination has been standardized. In some examples, information about the standardized CA combinations 122 can be viewable and/or searchable via the user interface 120.

The fallback CA options 124 stored in the band combination database 104 can include one or more sets of predefined fallback CA options indicating CA bandwidth classes of bands 306, as well as fallback CA bandwidth classes that can be used for downlink CA and/or uplink CA in the bands when carriers in the bands are lost. For example, the fallback CA options 124 can indicate that when a band combination configuration 302 allows up to two contiguous carriers in a band, downlink and uplink fallback CA options for that band can include a single carrier in the band. As another example, the fallback CA options 124 can indicate that when a band combination configuration 302 allows up to three non-contiguous carriers in a band, the downlink fallback CA options for the band can include two non-continuous carriers in the band, and the uplink fallback CA options for the band can include a single carrier in the band.

As an example, FIG. 5 shows example fallback CA options 500 that can be stored in the band combination database 104 and/or that can be used by the fallback combination determiner 112. The example fallback CA options 500 shown in FIG. 5 can be based on 3GPP TS 38.101-1 for FRI bands and 3GPP TS 38.101-2 for FR2 bands. The example fallback CA options 500 indicate CA bandwidth classes 502 that can be used with FRI bands and FR2 bands, as well as corresponding downlink fallback CA bandwidth classes 504 and uplink fallback CA bandwidth classes 506. For example, if a band combination configuration 302 indicates that particular FR2 band has a CA bandwidth class 502 of "G," the example fallback CA options 500 indicate that if a carrier is lost in the FR2 band, fallback CA options include using a single downlink carrier in the FR2 band as indicated by the downlink fallback CA bandwidth class 504 of "A," and using a single uplink carrier in the FR2 band as indicated by the uplink fallback CA bandwidth class 506 of "A."

Returning to FIG. 1, a user may provide user input 106 to the band combination engine 102 that defines the CA combination 108. The user input 106 can indicate one or more bands 306 associated with the CA combination 108, numbers of carriers per band of the CA combination 108, channel bandwidths 308 and/or a BCS 310 associated with the CA combination 108, and/or any other information associated with the CA combination 108. In some examples, the user input 106 may specify a CA bandwidth class associated with each band indicated by the user input 106, which as discussed above can indicate a number of contiguous carriers for the band and a range of aggregated bandwidth that can be achieved via the carriers in the band. In some examples, the user input 106 can be provided as a downlink band combination configuration 302 as discussed above with respect to FIGS. 3 and 4.

Based on the user input 106 defining the CA combination 108, the fallback combination determiner 112 can automatically determine a set of corresponding fallback CA combinations 114 associated with the CA combination 108. The fallback combination determiner 112 can also automatically determine the standardization statuses 116 of the fallback CA combinations 114.

For example, the band combination engine 102 can submit one or more queries to the band combination database 104 to retrieve information about the CA combination 108 defined by the user input 106, and/or one or more bands 306 associated with the CA combination 108. For instance, the band combination engine 102 can query the band combination database 104 to identify fallback CA options 124 associated with a loss of a carrier in each the bands 306 associated with the CA combination 108, as discussed above with respect to FIG. 5.

The fallback combination determiner 112 can automatically determine a set of allowable fallback CA combinations 114 that are associated with the losses of different carriers in different bands of the CA combination 108. As an example, if the CA combination 108 has one carrier in a first band, but has at least two other carriers in one or more other bands, the fallback combination determiner 112 can determine that an allowable fallback CA combination can omit the carrier of the first band but include the at least two other carriers in the one or more other bands. The fallback combination determiner 112 can also determine that an allowable fallback CA combination can include the carrier of the first band, and omit one of the at least two other carriers in the one or more other bands. As another example, if the CA combination 108 has three carriers in a particular band, and the fallback CA options 124 associated with that band include two carriers in the particular band, the fallback combination determiner 112 can determine that an allowable fallback CA combination can include the two carriers in the particular band.

In some examples, the fallback combination determiner 112 can be configured to automatically submit one or more queries to the band combination database 104 in association with each band of the CA combination 108, in order to determine fallback CA combinations 114 associated with the loss of a carrier from each band. The fallback combination determiner 112 can be configured with sets of predefined queries that are associated with different bands of CA combinations that include different numbers of bands and/or other attributes, that determine fallback options within bands and/or that omit bands, and/or other types of queries. Accordingly, the fallback combination determiner 112 can automatically submit relevant queries to the band combination database 104 that are associated with the CA combination 108 being evaluated. Examples of queries associated with CA combinations that include different numbers of bands are discussed further below with respect to FIG. 9. The fallback combination determiner 112 can also be configured to use a union operation, or to submit the queries together to the band combination database 104 using a union operation, to combine the fallback CA combinations 114 associated with the loss of a carrier from each band and to determine the full set of fallback CA combinations 114 associated with the CA combination 108 being evaluated.

The fallback combination determiner 112 can automatically determine downlink fallback CA combinations 114 and/or automatically determine uplink fallback CA combinations 114. In some examples, the fallback combination determiner 112 can also combine portions of the CA combination 108 and the downlink fallback CA combinations 114 or the uplink fallback CA combinations 114, to determine fallback CA combinations 114 that include downlink CA and/or uplink CA portions.

For example, the fallback combination determiner 112 can determine downlink fallback CA combinations 114 and/or uplink fallback CA combinations 114 associated with a band combination configuration 302 and corresponding uplink configurations 304. The fallback combination determiner 112 can also determine fallback CA combinations 114 that include the downlink band combination configuration 302, in conjunction with each uplink fallback CA combinations 114 and non-CA uplink option that are associated with losses of different uplink carriers defined by the uplink configurations 304. The fallback combination determiner 112 can also determine fallback CA combinations 114 that include the downlink fallback CA combinations 114 that are associated with the losses of different downlink carriers defined by the downlink band combination configuration 302, in conjunction with each uplink configuration 304 and non-CA uplink option.

As an example, given the band combination configuration 302 and uplink configurations 304 shown in FIG. 4, the fallback combination determiner 112 can automatically determine that fallback CA combinations 114 include "DL_n25A-n41C-n66A_BCS4," which has a downlink CA portion based on the downlink band combination configuration of "CA_n25A-n41C-n66A" and does not have an uplink CA portion due to a loss of any of the two carriers allowed by any of the uplink configurations 304. As another example, the fallback combination determiner 112 can also automatically determine that the fallback CA combinations 114 associated with the band combination configuration 302 and uplink configurations 304 shown in FIG. 4 include "DL_n25A-n41C_UL_n25A-n41A_BCS4," which includes a downlink CA portion associated with a loss of a downlink carrier from the n66 band, and that includes an uplink CA portion associated with the "CA_n25A-n41A" uplink configuration. The fallback combination determiner 112 can similarly determine that the fallback CA combinations 114 associated with the band combination configuration 302 and uplink configurations 304 shown in FIG. 4 include "DL_n25A-n41C_UL_n41C_BCS4," which includes a downlink CA portion associated with a loss of a downlink carrier from the n66 band, and that includes an uplink CA portion associated with the "CA_n41C" uplink configuration.

Processes used by the fallback combination determiner 112 to automatically determine fallback CA combinations 114 are discussed further below with respect to FIG. 8 and FIG. 9. Once the fallback combination determiner 112 has automatically determined the fallback CA combinations 114 associated with the CA combination 108, the band combination engine 102 can submit one or more queries to the band combination database 104 to determine the corresponding standardization statuses 116 of the fallback CA combinations 114. The fallback CA combinations 114, and corresponding standardization statuses 116, determined by the fallback combination determiner 112 can be presented via the user interface 120 of the band combination engine 102. In some examples, the fallback CA combinations 114 and corresponding standardization statuses 116 can be produced as output 118, which can be provided to the standards organization 110 as a standardization request associated with the CA combination 108 or used to produce such as a standardization request.

As discussed above, user input 106 defining the CA combination 108 can be provided to the band combination engine 102. In some examples, the user input 106 can be provided via the user interface 120 of the band combination engine 102. For example, FIG. 6 shows an example 600 of the user interface 120 of the band combination engine 102. As shown in FIG. 6, the user interface 120 can have fields, selectable controls, and/or other user interface elements 602 that allow a user to provide the user input 106 to the band combination engine 102. In other examples, the user input 106 can be provided to the band combination engine 102 as a text file or any other type of data. In some examples, the user input 106 can define multiple CA combinations, such that the band combination engine 102 can evaluate all of the CA combinations in sequence, in parallel, or in any other order to automatically generate fallback CA combinations 114 and corresponding standardization statuses 116 associated with each of the CA combinations.

When the band combination engine 102 receives user input 106 defining a CA combination 108, the band combination engine 102 can query the band combination database 104 to determine, based on the standardized CA combinations, whether the CA combination 108 has already been standardized or submitted for standardization. The user interface 120 may accordingly display a status symbol, color-coded notification, and/or other indicia that indicates whether the CA combination 108 has already been standardized or submitted for standardization.

In some examples, if the user input 106 is provided as a downlink band combination configuration 302, the band combination engine 102 may automatically generate a set of corresponding uplink configurations 304 that use uplink carriers in one or two of the bands indicated by the downlink band combination configuration 302. The band combination engine 102 may also query the band combination database 104 to determine, based on the standardized CA combinations, whether the uplink configurations 304 have already been standardized or submitted for standardization. The user interface 120 may accordingly display a status symbol, color-coded notification, and/or other indicia that indicates whether the uplink configurations 304 have already been standardized or submitted for standardization.

The fallback combination determiner 112 can also use the user input 106 defining the CA combination 108 to automatically generate a set of fallback CA combinations 114 that correspond to the CA combination 108, as discussed above. When the fallback combination determiner 112 determines the fallback CA combinations 114 associated with the CA combination 108, the fallback combination determiner 112 can also query the band combination database 104 to obtain the standardization statuses 116 of the fallback CA combinations 114. In some examples, the fallback CA combinations 114 generated by the fallback combination determiner 112 can be displayed in the user interface 120 along with the corresponding standardization statuses 116, as shown in FIG. 6.

For example, if a fallback CA combination 114 determined by the fallback combination determiner 112 is within the standardized CA combinations 122 tracked by the band combination database 104, the band combination database 104 can return information indicating that the fallback CA combination 114 has been standardized, or has already been submitted for standardization. The standardization status of the fallback CA combination 114 can be presented via the user interface 120 and/or via other output 118, for instance via color coding and/or text descriptions such as "Completed" or "In Progress."

However, if a fallback CA combination 114 determined by the fallback combination determiner 112 is not within the standardized CA combinations 122 tracked by the band combination database 104, the band combination database 104 can return information indicating that the fallback CA combination 114 has not yet been submitted for standardization. The standardization status of the fallback CA combination 114 can be presented via the user interface 120 and/or via other output 118, for instance via color coding and/or a text description such as "New."

As discussed above, the standards organization 110 may require that a standardization request for a new CA combination 108 identify all of the corresponding fallback CA combinations 114, as well as the standardization statuses 116 associated with the fallback CA combinations 114. A submitting party may submit multiple CA combinations 108 to the standards organization 110 at the same time, and thus need to identify the fallback CA combinations 114 and corresponding standardization statuses 116 associated with each of the multiple CA combinations 108. Because the band combination engine 102 can automatically determine the set of fallback CA combinations 114, and corresponding standardization statuses 116, for each of the CA combinations 108 being submitted for standardization, the risks of missing a required fallback CA combination, including duplicate fallback CA combinations 114, or including incorrect standardization statuses 116 can be reduced.

For example, when a user provides user input 106 via the user interface 120 to define a new CA combination 108 as shown in FIG. 6, the band combination engine 102 can determine and display the band combination configuration 302 and uplink configurations 304 associated with the new CA combination 108 as shown in FIG. 6. The fallback combination determiner 112 can also automatically determine all of the corresponding fallback CA combinations 114 and associated standardization statuses 116 as discussed above, and present the corresponding fallback CA combinations 114 and associated standardization statuses 116 as supported fallback modes 402 via the user interface 120 as shown in FIG. 6. If the standardization statuses 116 indicate that all of the fallback CA combinations 114 have already been standardized or submitted for standardization, a standardization request for the new CA combination 108 can be prepared by the band combination engine 102 or based on the output 118 of the band combination engine 102. If the standardization statuses 116 instead indicate that any of the fallback CA combinations 114 have not yet been submitted for standardization, a user or the band combination engine 102 can confirm that those fallback CA combinations are also submitted to the standards organization 110 for standardization along with the new CA combination 108.

Overall, the output 118 of the band combination engine 102, in some examples displayed via the user interface 120, can indicate the set of fallback CA combinations 114 associated with the CA combination 108 that has been automatically determined by the fallback combination determiner 112 and can be submitted in a standardization request for the CA combination 108. Moreover, because the user interface 120 and/or other output 118 can indicate the automatically-determined standardization statuses 116 of each of the fallback CA combinations 114, a user can quickly determine from the user interface 120 and/or other output 118 which fallback CA combinations 114 have not yet been submitted for standardization and should thus be submitted for standardization at the same time as the CA combination 108.

The user interface 120 and/or other output 118 of the band combination engine 102 can accordingly reduce the chances of errors in standardization requests submitted to the standards organization. Such a reduction in errors can reduce usage of processor cycles, bandwidth, and/or other computing resources to fix such errors. Moreover, presenting the automatically-determined standardization statuses 116 of each of the fallback CA combinations 114 in a single user interface view can reduce usage of processor cycles, bandwidth, and/or other computing resources to open other programs, windows, and/or user interface views to look up the standardization statuses 116 of each fallback CA combination 114 individually.

Additionally, the band combination engine 102 can quickly and automatically generate and/or display output 118 associated with multiple CA combinations being submitted for standardization, including fallback CA combinations 114 and corresponding standardization statuses 116 for each CA combination. Accordingly, the band combination engine 102 can allow an entity to submit larger numbers of CA combinations to the standards organization 110 for standardization more quickly and/or more accurately, such that new CA combinations can be standardized more quickly and become usable by UEs 202 and base stations 204. In some examples or situations, such UEs 202 and base stations 204 may be able to achieve higher throughput, bandwidth, and/or other benefits via such newly standardized CA combinations relative to previously-standardized CA combinations.

Example Architecture

Figure 7:
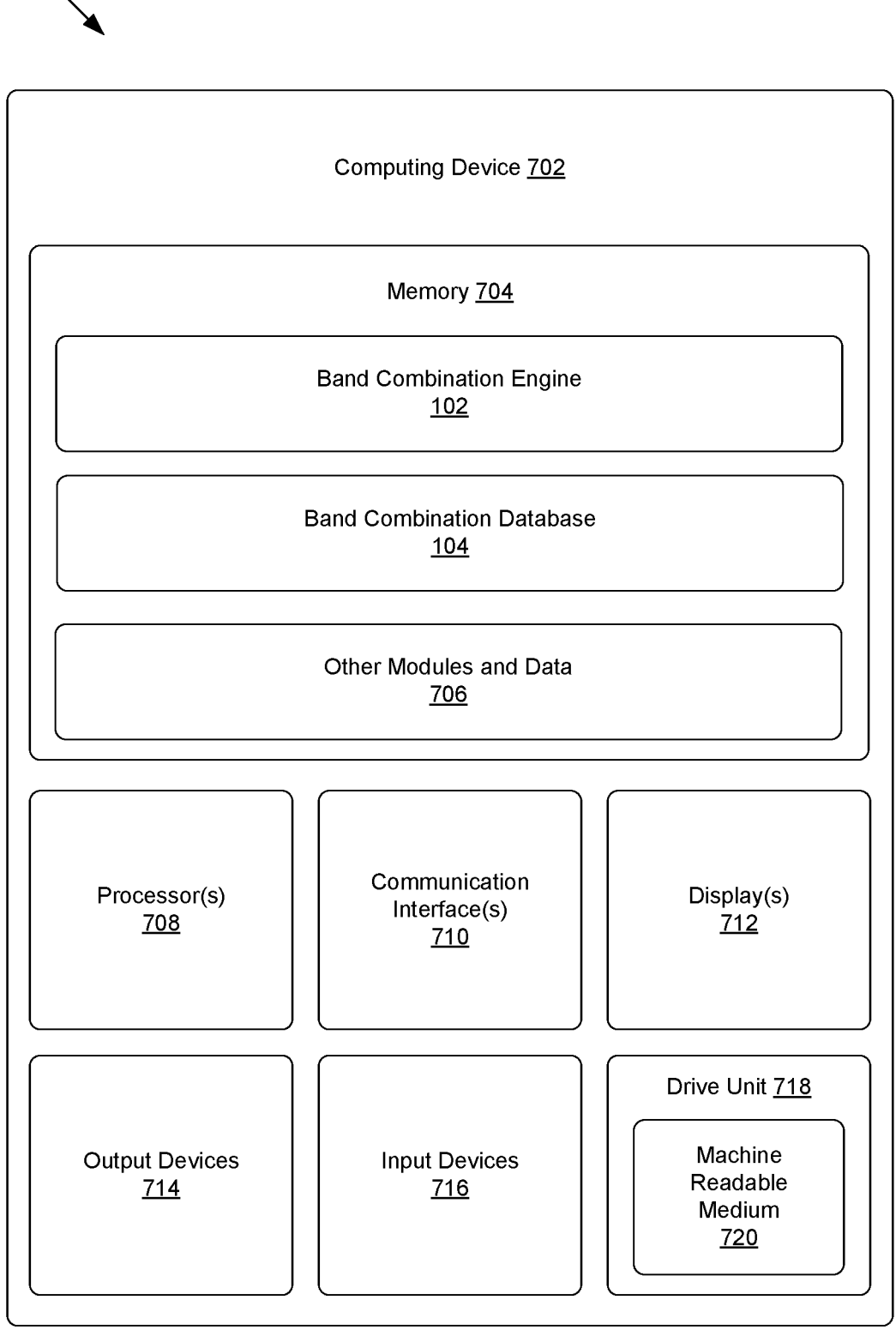
FIG. 7 shows an example system architecture for a computing device.

FIG. 7 shows an example system architecture 700 for a computing device 702 associated with the systems described herein. The computing device 702 can be a server, computer, or other type of computing device that executes and/or stores one or more portions of the CA combination generation system 100, such as one or more elements of the band combination engine 102 and/or the band combination database 104. In some examples, elements of the CA combination generation system 100 can be distributed among, and/or be executed by, multiple computing devices similar to the computing device shown in FIG. 7. For example, the band combination engine 102 may execute on a different computing device than a computing device that stores the band combination database 104.

The computing device 702 can include memory 704. In various examples, the memory 704 can include system memory, which may be volatile (such as RAM), non-volatile (such as ROM, flash memory, etc.) or some combination of the two. The memory 704 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing device 702 associated with the CA combination generation system 100. Any such non-transitory computer-readable media may be part of the computing device 702.

The memory 704 can store computer-readable instructions and/or other data associated with operations of the CA combination generation system 100. For example, the memory 704 can store computer-readable instructions and/or other data associated with the band combination engine 102 and/or the band combination database 104. The memory 704 can also store other modules and data 706. The other modules and/or data 706 can be utilized by the computing device 702 to perform or enable performing any action taken by the computing device 702. Such other modules and data 706 can include a platform, operating system, firmware, and/or applications, and data utilized by the platform, operating system, firmware, and/or applications.

The computing device 702 can also have processor(s) 708, communication interfaces 710, a display 712, output devices 714, input devices 716, and/or a drive unit 718 including a machine readable medium 720.

In various examples, the processor(s) 708 can be a central processing unit (CPU), a graphics processing unit (GPU), both a CPU and a GPU, or any other type of processing unit. Each of the one or more processor(s) 708 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 708 may also be responsible for executing computer applications stored in the memory 704, which can be associated with common types of volatile (RAM) and/or nonvolatile (ROM) memory.

The communication interfaces 710 can include transceivers, modems, interfaces, antennas, telephone connections, and/or other components that can transmit and/or receive data over networks, telephone lines, or other connections.

The display 712 can be a liquid crystal display, or any other type of display commonly used in computing devices. For example, a display 712 may be a touch-sensitive display screen, and can then also act as an input device or keypad, such as for providing a soft-key keyboard, navigation buttons, or any other type of input.

The output devices 714 can include any sort of output devices known in the art, such as a display 712, speakers, a vibrating mechanism, and/or a tactile feedback mechanism. Output devices 714 can also include ports for one or more peripheral devices, such as headphones, peripheral speakers, and/or a peripheral display.

The input devices 716 can include any sort of input devices known in the art. For example, input devices 716 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 720 can store one or more sets of instructions, such as software or firmware, that embodies any one or more of the methodologies or functions described herein. The instructions can also reside, completely or at least partially, within the memory 704, processor(s) 708, and/or communication interface(s) 710 during execution thereof by the computing device 702. The memory 704 and the processor(s) 708 also can constitute machine readable media 720.

Example Operations

Figure 8:
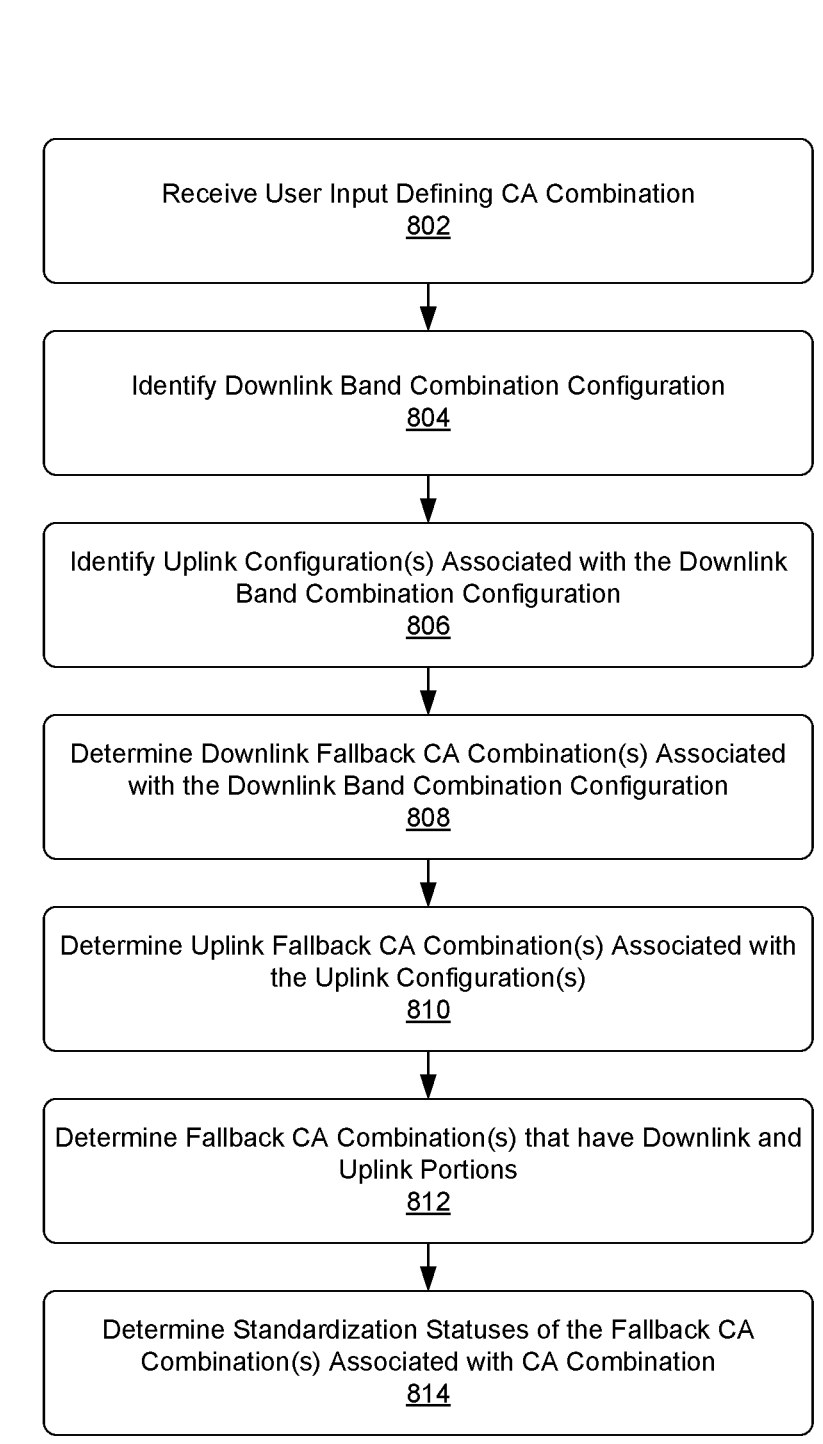
FIG. 8 shows a flowchart of a process the band combination engine can use to determine a set of fallback CA combinations associated with a CA combination, as well as standardization statuses of the fallback CA combinations.

FIG. 8 shows a flowchart 800 of a process the band combination engine 102 can use to determine a set of fallback CA combinations 114 associated with a CA combination, as well as the standardization statuses 116 of the fallback CA combinations 114. At block 802, the band combination engine 102 can receive user input 106 defining the CA combination. For example, as shown in FIG. 6, a user may use one or more user interface elements 602 to enter attributes of the CA combination, such as identifiers of bands to be used in the CA combination, bandwidth classes associated with one or more carriers in each band, and/or other attributes of the CA combination. In other examples, the user input 106 can be provided to the band combination engine 102 as a text file or any other type of data.

At block 804, the band combination engine 102 can identify the downlink band combination configuration 302 associated with the CA combination based on the user input 106. The band combination engine 102 can similarly identify, at block 806, zero or more uplink configurations 304 associated with the downlink band combination configuration 302, such as uplink configurations 304 that include two or more uplink carriers across one or more bands identified in the downlink band combination configuration 302.

At block 808, the band combination engine 102 can determine zero or more downlink fallback CA combinations 114 associated with the downlink band combination configuration 302. For example, the band combination engine 102 can submit one or more queries to the band combination database 104 to identify distinct fallback CA options 124 associated with a separate loss of a downlink carrier from each band of the downlink band combination configuration 302, and generate distinct downlink fallback CA combinations 114 based on corresponding fallback CA options 124. The band combination engine 102 can also use a union operator or other operator to combine the results of the queries and obtain a full set of downlink fallback CA combinations 114 associated with the downlink band combination configuration 302. In some examples, the band combination engine 102 can use the process described below with respect to FIG. 9 to determine one or more downlink fallback CA combinations 114 associated with the downlink band combination configuration 302.

At block 810, the band combination engine 102 can similarly determine zero or more uplink fallback CA combinations 114 associated with the uplink configurations 304. For example, the band combination engine 102 can submit one or more queries to the band combination database 104 to identify distinct fallback CA options 124 associated with a separate loss of an uplink carrier from each band of each uplink configuration 304, and generate distinct uplink fallback CA combinations 114 based on corresponding fallback CA options 124. The band combination engine 102 can also use a union operator or other operator to combine the results of the queries and obtain a full set of uplink fallback CA combinations 114 associated with each of the uplink configurations 304. In some examples, the band combination engine 102 can use the process described below with respect to FIG. 9 to determine one or more uplink fallback CA combinations 114 associated with each of the uplink configurations 304.

At block 812, the band combination engine 102 can also determine any additional fallback CA combinations 114 that have both downlink and uplink portions. For example, such additional fallback CA combinations 114 can include a downlink portion based on the downlink band combination configuration 302, and an uplink portion based on a non-CA uplink option or an uplink fallback CA combination determined at block 810 that is associated with the loss of an uplink carrier. Similarly, such additional fallback CA combinations 114 can include a downlink portion based on a downlink fallback CA combination determined at block 808 that is associated with the loss of a downlink carrier, and a non-CA uplink option or one of the uplink configurations 304 determined at block 806.

Accordingly, at blocks 808-812, the band combination engine 102 can determine a full set of fallback CA combinations 114 that are associated with different permutations of the components of the CA combination 108 and that can be used if different downlink and uplink carriers defined by the CA combination 108 are lost.

When the band combination engine 102 determines each fallback CA combination 114, or after determining the full set of fallback CA combinations 114, the band combination engine 102 can determine the standardization statuses 116 of the fallback CA combinations 114 at block 814. For example, the band combination engine 102 can query the band combination database 104 to determine whether each fallback CA combination 114 has already been standardized as a CA combination by the standards organization 110, has already been submitted to the standards organization 110 for standardization as a CA combination, or has not yet been submitted to the standards organization 110 for standardization as a CA combination.

In some examples, the band combination engine 102 can display the set of fallback CA combinations 114 and corresponding standardization statuses 116, determined via blocks 808-814, in the user interface 120 as supported fallback modes 402 that are associated with the band combination configuration 302 and the uplink configurations 304, as shown in FIG. 6. In other examples, the set of fallback CA combinations 114 and corresponding standardization statuses 116 can be provided as other output 118 of the band combination engine 102, such as a spreadsheet or an automatically-generated standardization request.

The band combination engine 102 can repeat the process shown in FIG. 8 for multiple CA combinations 108. For example, the band combination engine 102 can repeat the process shown in FIG. 8 for different CA combinations 108 provided separately via the user interface 120 or by other distinct user input 106. As another example, the band combination engine 102 can repeat the process shown in FIG. 8 for a set of CA combinations 108 provided together in a text file or other user input 106.

Figure 9:
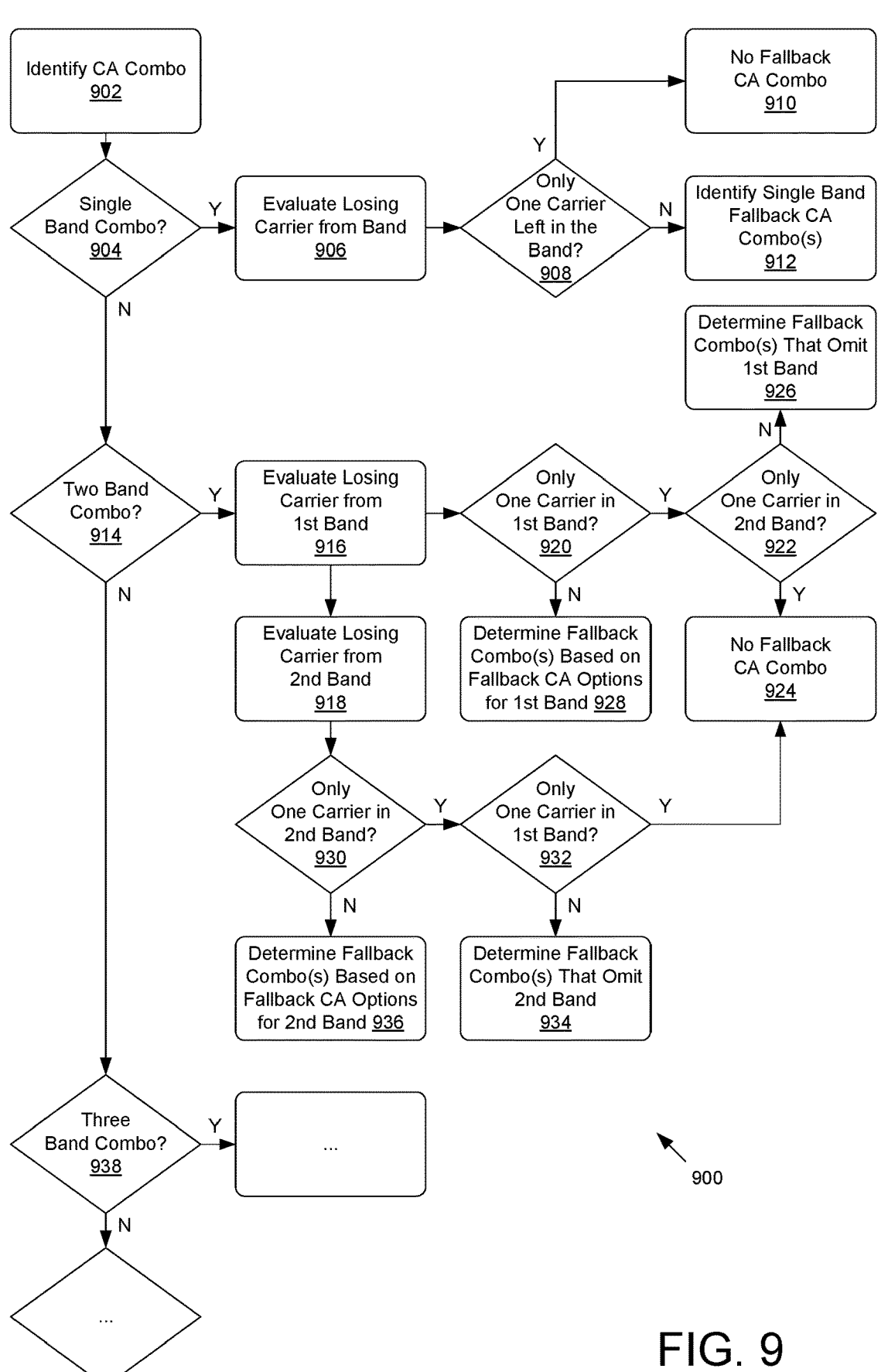
FIG. 9 shows a flowchart of a process the fallback combination determiner can use to determine fallback CA combinations associated with a particular CA combination.

FIG. 9 shows a flowchart 900 of a process the fallback combination determiner 112 can use to determine fallback CA combinations 114 associated with a particular CA combination. At block 902, the fallback combination determiner 112 can identify the CA combination. For example, the fallback combination determiner 112 can identify the CA combination based on user input 106, or based on other data provided to, or generated by, the band combination engine 102.

In some examples, the CA combination identified at block 902 may be a band combination configuration 302 for downlink CA, and the fallback combination determiner 112 can use the process shown in FIG. 9 to determine a set of possible downlink fallback CA combinations 114. As an example, the CA combination identified at block 902 may be a downlink band combination configuration determined at block 804 of the process shown in FIG. 8, and the fallback combination determiner 112 can use the process shown in FIG. 9 to determine corresponding downlink fallback CA combinations at block 808 of the process shown in FIG. 8.

In other examples, the CA combination identified at block 902 may be an uplink configuration 304 for uplink CA, and the fallback combination determiner 112 can use the process shown in FIG. 9 to determine a set of possible uplink fallback CA combinations 114. As an example, the CA combination identified at block 902 may be an uplink configuration determined at block 806 of the process shown in FIG. 8, and the fallback combination determiner 112 can use the process shown in FIG. 9 to determine corresponding uplink fallback CA combinations at block 810 of the process shown in FIG. 8.

In some examples, the fallback combination determiner 112 can repeat the process shown in FIG. 9 for the band combination configuration 302 and each of a set of uplink configurations 304. Accordingly, as discussed above with respect to FIG. 8, the fallback combination determiner 112 can determine downlink fallback CA combinations 114, uplink fallback CA combinations 114, and fallback CA combinations that include both downlink and uplink components.

At block 904, the fallback combination determiner 112 can determine whether the CA combination is associated with a single band. If the CA combination is associated with a single band (Block 904—Yes), the fallback combination determiner 112 can evaluate losing a carrier from the band at block 906. At block 908, the fallback combination determiner 112 can determine whether the loss of a carrier from the band would result in only one carrier remaining in the band.

If the fallback combination determiner 112 determines that losing a carrier would result in only a single carrier remaining in the band (Block 908—Yes), the fallback combination determiner 112 can determine at block 910 that no corresponding fallback CA combination 114 is available. For example, because in this situation the CA combination included two carriers in a single band, such that only one carrier would remain if either of the two carriers is lost, a UE and base station could fall back to using that single carrier instead of using CA, and no corresponding fallback CA combination 114 may be available.

However, if the fallback combination determiner 112 determines that two or more carriers would remain in the band if one carrier was lost (Block 908—No), at block 912 the fallback combination determiner 112 can determine one or more fallback CA combinations 114 that are associated with the loss of a carrier in the band. For example, the fallback combination determiner 112 can query the band combination database 104 to determine which downlink fallback CA bandwidth class 504 or uplink fallback CA bandwidth class 506 is associated with the CA bandwidth class 502 of the band, and can determine the fallback CA combinations 114 at block 912 based on the downlink fallback CA bandwidth class 504 or uplink fallback CA bandwidth class 506.

If the CA combination identified at block 902 is not associated with a single band (Block 904—No), the fallback combination determiner 112 can determine at block 914 whether the CA combination is associated with two bands. If the CA combination is associated with two bands (Block 914—Yes), the fallback combination determiner 112 can determine one or more fallback CA combinations 114 by evaluating losing a carrier from a first band at block 916, and by evaluating losing a carrier from a second band at block 918.

To determine fallback CA combinations 114 associated with losing a carrier from the first band at block 916, the fallback combination determiner 112 can determine at block 920 whether the CA combination includes only a single carrier in the first band. If the fallback combination determiner 112 determines that the CA combination only includes a single carrier in the first band (Block 920—Yes), the fallback combination determiner 112 can determine at block 922 whether the CA combination includes only a single carrier in the second band. If the fallback combination determiner 112 determines at block 922 the CA combination includes only a single carrier in the second band (Block 922—Yes), the fallback combination determiner 112 can determine at block 924 that no corresponding fallback CA combination 114 is available. For example, because in this situation the CA combination included one carrier in the first band and one carrier in the second band, only one of those carriers would remain if either of the two carriers is lost, and a UE and base station could fall back to using that single carrier instead of using CA, and no corresponding fallback CA combination 114 may be available.

However, if the fallback combination determiner 112 instead determines at block 922 that the CA combination includes multiple carriers in the second band (Block 922— No), at block 926 the fallback combination determiner 112 can determine one or more fallback CA combinations 114 that are based on the loss of the single carrier in the first band. For example, because in this situation the CA combination included one carrier in the first band and multiple carriers in the second band, the fallback combination determiner 112 can determine a fallback CA combination 114 that omits the carrier in the first band, and includes two or more carriers in the second band.

If the fallback combination determiner 112 determines at block 920 that the CA combination includes more than one carrier in the first band (Block 920—No), at block 928 the fallback combination determiner 112 can determine one or more fallback CA combinations 114 that are based on the loss of a carrier in the first band. For example, the fallback combination determiner 112 can query the band combination database 104 to determine which downlink fallback CA bandwidth class 504 or uplink fallback CA bandwidth class 506 is associated with the CA bandwidth class 502 of the first band, and can determine the fallback CA combinations 114 based on the downlink fallback CA bandwidth class 504 or uplink fallback CA bandwidth class 506 associated with the first band. As an example, because in this situation the CA combination included multiple carriers in the first band and one or more carriers in the second band, the fallback combination determiner 112 can determine a fallback CA combination 114 that omits one of the carriers in the first band, has at least one carrier remaining in the first band, and includes the one or more carriers in the second band.

The fallback combination determiner 112 can thus evaluate losing a carrier from the first band of the CA combination at block 916, by using the operations of blocks 920-928 discussed above to determine a set of zero or more corresponding fallback CA combinations 114 that could be used if a carrier were lost from the first band of the CA combination. The fallback combination determiner 112 can also evaluate losing a carrier from the second band of the CA combination at block 918, by using the operations of blocks 930-936 discussed below to determine a set of zero or more corresponding fallback CA combinations 114 that could be used if a carrier were lost from the second band of the CA combination.

To determine fallback CA combinations 114 associated with losing a carrier from the second band at block 918, the fallback combination determiner 112 can determine at block 930 whether the CA combination includes only a single carrier in the second band. If the fallback combination determiner 112 determines that the CA combination only includes a single carrier in the second band (Block 930—Yes), the fallback combination determiner 112 can determine at block 932 whether the CA combination includes only a single carrier in the first band. If the fallback combination determiner 112 determines at block 932 the CA combination includes only a single carrier in the first band (Block 932—Yes), the fallback combination determiner 112 can determine at block 924 that no corresponding fallback CA combination 114 is available. As discussed above, because in this situation the CA combination included one carrier in the first band and one carrier in the second band, only one of those carriers would remain if either of the two carriers is lost, and a UE and base station could fall back to using that single carrier instead of using CA, and no corresponding fallback CA combination 114 may be available.

However, if the fallback combination determiner 112 instead determines at block 932 that the CA combination includes multiple carriers in the first band (Block 932—No), at block 934 the fallback combination determiner 112 can determine one or more fallback CA combinations 114 that are based on the loss of the single carrier in the second band. For example, because in this situation the CA combination included multiple carriers in the first band and one carrier in the second band, the fallback combination determiner 112 can determine a fallback CA combination 114 that includes two or more carriers in the first band, but that omits the carrier in the second band.

If the fallback combination determiner 112 determines at block 930 that the CA combination includes more than one carrier in the second band (Block 930—No), at block 936 the fallback combination determiner 112 can determine one or more fallback CA combinations 114 that are based on the loss of a carrier in the second band. For example, the fallback combination determiner 112 can query the band combination database 104 to determine which downlink fallback CA bandwidth class 504 or uplink fallback CA bandwidth class 506 is associated with the CA bandwidth class 502 of the second band, and can determine the fallback CA combinations 114 based on the downlink fallback CA bandwidth class 504 or uplink fallback CA bandwidth class 506 associated with the second band. As an example, because in this situation the CA combination included one or more carriers in the first band and multiple carriers in the second band, the fallback combination determiner 112 can determine a fallback CA combination 114 that includes the one or more carriers in the first band, omits one of the carriers in the second band, and that has at least one carrier remaining in the second band.

If the CA combination identified at block 902 is not associated with a single band (Block 904—No) or two bands (Block 914—No), the fallback combination determiner 112 can determine at block 938 whether the CA combination is associated with three bands. If the CA combination is associated with three bands (Block 938—Yes), the fallback combination determiner 112 can use a set of steps (not shown) to determine fallback CA combinations 114 that are associated with the loss of a carrier from a first band, a second band, and a third band. If the CA combination is not associated with three bands (Block 938—No), the fallback combination determiner 112 can use other sets of steps (not shown) to fallback CA combinations 114 that are associated with the loss of a carrier from sets of four bands, sets of five bands, or any other number of bands associated with the CA combination identified at block 902.

Overall, the fallback combination determiner 112 can use the process shown in FIG. 9 to determine zero or more fallback CA combinations 114 associated with the CA combination identified at block 902, for instance at block 924, block 926, block 928, block 934, and block 936 for a CA combination that includes two bands. In some examples the fallback combination determiner 112 can use the process shown in FIG. 9 to determine downlink fallback CA combinations 114, uplink fallback CA combinations 114, fallback CA combinations 114 that are based on a downlink portion of the CA combination and zero or more uplink fallback CA combinations 114, and/or fallback CA combinations 114 that are based on zero or more downlink fallback CA combinations 114 and an uplink portion of the CA combination.

The set of fallback CA combinations 114 determined via the process shown in FIG. 9 can be displayed as fallback CA combinations 114 via the user interface 120, and/or can be identified as fallback CA combinations 114 in a standardization request associated with the CA combination that is to be submitted to the standards organization 110. The band combination engine 102 can also query the band combination database 104 to obtain the standardization statuses 116 of the fallback CA combinations 114, such that the standardization statuses 116 of the fallback CA combinations 114 can be presented in the user interface 120 and/or included in the standardization request associated with the CA combination that is to be submitted to the standards organization 110.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method, comprising:

displaying, by the one or more processors, a user interface;

receiving, by one or more processors, user input defining a carrier aggregation (CA) combination that includes two or more carriers across one or more bands, wherein the user input is received via one or more user interface elements of the user interface;

automatically determining, by the one or more processors, based on the user input, and without receiving further user input, fallback CA combinations associated with the CA combination, wherein different fallback CA combinations are associated with losses of different carriers from different bands of the one or more bands;

automatically, determining, by the one or more processors and without receiving the further user input, standardization statuses of the fallback CA combinations by submitting corresponding queries to a database indicating standardized CA combinations;

providing, by the one or more processors, output indicating the fallback CA combinations, and the standardization statuses of the fallback CA combinations, associated with the CA combination, wherein the providing includes displaying the output via the user interface, including displaying an indicator of the standardization status for the CA combination and each of the fallback CA combinations;

determining, based on the output indicating the standardization statuses of the fallback CA combinations, one or more fallback CA combinations that are absent from the fallback CA combinations and that have yet to be submitted for standardization; and causing the one or more fallback CA combinations to be submitted for the standardization at a same time as the fallback CA combinations.

2. The method of claim 1, further comprising submitting a standardization request for the standardization of the CA combination and the fallback CA combinations.

3. The method of claim 1, wherein determining the fallback CA combinations comprises:

submitting, by the one or more processors, and to the database, queries associated with the losses of the different carriers from the different bands;

determining, by the one or more processors, individual fallback CA combinations based on results returned by the database in response to the queries; and combining, by the one or more processors, the individual fallback CA combinations into a set of fallback CA combinations.

4. The method of claim 1, wherein the CA combination is associated with a downlink band combination configuration and one or more uplink configurations, and the different fallback CA combinations are determined based on losses of at least one of downlink carriers of the downlink band combination configuration or uplink carriers of the one or more uplink configurations.

5. The method of claim 1, wherein determining the fallback CA combinations comprises:

determining one or more first fallback CA combinations associated with loss of a first carrier in a first band of the CA combination; and determining one or more second fallback CA combinations associated with loss of a second carrier in a second band of the CA combination.

6. The method of claim 5, wherein:

the first carrier is an only carrier in the first band defined by the CA combination, the one or more first fallback CA combinations omits the first band, and the one or more first fallback CA combinations includes at least two carriers across at least the second band.

7. The method of claim 5, wherein:

the first carrier is one of multiple carriers in the first band defined by the CA combination, and the one or more first fallback CA combinations are determined based on fallback CA options tracked in the database that are associated with loss of one of the multiple carriers in the first band.

8. A computing device, comprising:

one or more processors, and memory storing computer-executable instructions that, when executed by the one or more processors, cause the one or more processors to perform operations comprising:

displaying a user interface;

receiving user input defining a carrier aggregation (CA) combination that includes two or more carriers across one or more bands, wherein the user input is received via one or more user interface elements of the user interface;

determining, based on the user input, fallback CA combinations associated with the CA combination, wherein different fallback CA combinations are associated with losses of different carriers from different bands of the one or more bands;

determining standardization statuses of the fallback CA combinations by submitting corresponding queries to a database indicating standardized CA combinations;

providing output indicating the fallback CA combinations, and the standardization statuses of the fallback CA combinations, associated with the CA combination, wherein the providing includes displaying the output via the user interface, including displaying an indicator of the standardization status for the CA combination and each of the fallback CA combinations;

determining, based on the output indicating the standardization statuses of the fallback CA combinations, one or more fallback CA combinations that are absent from the fallback CA combinations and that have yet to be submitted for standardization; and causing the one or more fallback CA combinations to be submitted for the standardization at a same time as the fallback CA combinations.

9. The computing device of claim 8, wherein determining the fallback CA combinations comprises:

submitting, to the database, queries associated with the losses of the different carriers from the different bands;

determining individual fallback CA combinations based on results returned by the database in response to the queries; and combining the individual fallback CA combinations into a set of fallback CA combinations.

10. The computing device of claim 8, wherein the CA combination is associated with a downlink band combination configuration and one or more uplink configurations, and the different fallback CA combinations are determined based on losses of at least one of downlink carriers of the downlink band combination configuration or uplink carriers of the one or more uplink configurations.

11. The computing device of claim 8, wherein determining the fallback CA combinations comprises:

determining one or more first fallback CA combinations associated with loss of a first carrier in a first band of the CA combination; and determining one or more second fallback CA combinations associated with loss of a second carrier in a second band of the CA combination.

12. The computing device of claim 11, wherein:

the first carrier is an only carrier in the first band defined by the CA combination, the one or more first fallback CA combinations omits the first band, and the one or more first fallback CA combinations includes at least two carriers across at least the second band.

13. The computing device of claim 11, wherein:

the first carrier is one of multiple carriers in the first band defined by the CA combination, and the one or more first fallback CA combinations are determined based on fallback CA options tracked in the database that are associated with loss of one of the multiple carriers in the first band.

14. One or more non-transitory computer-readable media storing computer-executable instructions that, when executed by one or more processors, cause the one or more processors to:

displaying a user interface;

receive user input defining a carrier aggregation (CA) combination that includes two or more carriers across one or more bands, wherein the user input is received via one or more user interface elements of the user interface;

determine, based on the user input, fallback CA combinations associated with the CA combination, wherein different fallback CA combinations are associated with losses of different carriers from different bands of the one or more bands;

determine standardization statuses of the fallback CA combinations by submitting corresponding queries to a database indicating standardized CA combinations;

provide output indicating the fallback CA combinations, and the standardization statuses of the fallback CA combinations, associated with the CA combination, wherein the providing includes displaying the output via the user interface, including displaying an indicator of the standardization status for the CA combination and each of the fallback CA combinations;

determining, based on the output indicating the standardization statuses of the fallback CA combinations, one or more fallback CA combinations that are absent from the fallback CA combinations and that have yet to be submitted for standardization; and causing the one or more fallback CA combinations to be submitted for the standardization at a same time as the fallback CA combinations.

15. The one or more non-transitory computer-readable media of claim 14, wherein the computer-executable instructions cause the one or more processors to determine the fallback CA combinations by:

submitting, to the database, queries associated with the losses of the different carriers from the different bands;

determining individual fallback CA combinations based on results returned by the database in response to the queries; and combining the individual fallback CA combinations into a set of fallback CA combinations.

16. The one or more non-transitory computer-readable media of claim 14, wherein the CA combination is associated with a downlink band combination configuration and one or more uplink configurations, and the different fallback CA combinations are determined based on losses of at least one of downlink carriers of the downlink band combination configuration or uplink carriers of the one or more uplink configurations.

17. The one or more non-transitory computer-readable media of claim 14, wherein the computer-executable instructions cause the one or more processors to determine the fallback CA combinations by:

determining one or more first fallback CA combinations associated with loss of a first carrier in a first band of the CA combination; and determining one or more second fallback CA combinations associated with loss of a second carrier in a second band of the CA combination.

18. The method of claim 1, wherein the CA combination and the fallback CA combinations are utilized for uplink carrier aggregation and downlink carrier aggregation during communications between a user equipment (UE) and one or more base stations of a telecommunications network.

19. The method of claim 1, wherein the indicator of the standardization status for the CA combination and the each of the fallback CA combinations indicates whether the CA combination and the each of the fallback CA combinations have been submitted for the standardization.

20. The method of claim 1, wherein the indicator of the standardization status for the CA combination and the each of the fallback CA combinations is presented within the user interface.

* * * * *